United States Patent
Kim et al.

(10) Patent No.: US 11,750,793 B2
(45) Date of Patent: *Sep. 5, 2023

(54) DISPLAY MODULE AND DISPLAY DEVICE INCLUDING THE SAME

(71) Applicant: Samsung Display Co., Ltd., Yongin-Si (KR)

(72) Inventors: Beomshik Kim, Yongin-si (KR); Rangkyun Mok, Seoul (KR); Jiwon Lee, Hwaseong-si (KR); Youngsang Ha, Suwon-si (KR); SuJung Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 114 days.

This patent is subject to a terminal disclaimer.

(21) Appl. No.: 17/354,300

(22) Filed: Jun. 22, 2021

(65) Prior Publication Data

US 2021/0314555 A1  Oct. 7, 2021

Related U.S. Application Data

(63) Continuation of application No. 16/934,269, filed on Jul. 21, 2020, now Pat. No. 11,057,611.

(30) Foreign Application Priority Data

Nov. 5, 2019  (KR) .......................... 10-2019-0140477

(51) Int. Cl.
*H04N 13/351* (2018.01)
*H04N 13/167* (2018.01)
(Continued)

(52) U.S. Cl.
CPC ......... *H04N 13/351* (2018.05); *H04N 13/167* (2018.05); *H04N 13/305* (2018.05); *H04N 13/324* (2018.05)

(58) Field of Classification Search
CPC .. H04N 13/351; H04N 13/305; H04N 13/324; H04N 13/167
See application file for complete search history.

(56) References Cited

U.S. PATENT DOCUMENTS 6,064,424 A    5/2000  Van Berkel et al.
9,250,446 B2   2/2016  Krijn et al.
(Continued)

FOREIGN PATENT DOCUMENTS

KR    1020160004474 A    1/2016
KR    101688400 B1       12/2016
(Continued)

*Primary Examiner* — Nam D Pham
(74) *Attorney, Agent, or Firm* — CANTOR COLBURN LLP

(57) ABSTRACT

A display panel includes a plurality of pixels including a first type pixel, a second type pixel, and a third type pixel, and a lens array disposed on a first surface of the display panel and having an inclination angle. The first type pixel and the second type pixel are disposed adjacent to each other in a second direction. The third type pixel is disposed adjacent to the first type pixel and the second type pixel in a first direction. A pitch of the third type pixel in the second direction is less than or equal to a sum of a pitch of the first type pixel in the second direction and a pitch of the second type pixel in the second direction.

20 Claims, 13 Drawing Sheets

(51) Int. Cl.
*H04N 13/324* (2018.01)
*H04N 13/305* (2018.01)

(56) References Cited

U.S. PATENT DOCUMENTS

| | | |
|---|---|---|
| 9,395,548 B2 | 7/2016 | Kroon et al. |
| 9,581,825 B2 | 2/2017 | Hamagishi et al. |
| 10,178,377 B2 | 1/2019 | Kim et al. |
| 2013/0208356 A1* | 8/2013 | Saito .................... H04N 13/305 359/463 |
| 2018/0115771 A1 | 4/2018 | Kwon et al. |

FOREIGN PATENT DOCUMENTS

| | | |
|---|---|---|
| KR | 1020180044454 A | 5/2018 |
| KR | 101875012 B1 | 7/2018 |
| KR | 101912255 B1 | 10/2018 |

\* cited by examiner

DISPLAY MODULE AND DISPLAY DEVICE INCLUDING THE SAME

This application is a continuation of U.S. patent application Ser. No. 16/934,269, filed on Jul. 21, 2020, which claims priority to Korean Patent Application No. 10-2019-0140477, filed on Nov. 5, 2019, and all the benefits accruing therefrom under 35 U.S.C. § 119, the content of which in its entirety is herein incorporated by reference.

BACKGROUND

1. Field

Exemplary embodiments of the invention herein relate to a display module capable of displaying a three-dimensional ("3D") image and a display device including the same.

2. Description of Related Art

Three-dimensional ("3D") display technology is being applied to various image display fields such as movies, televisions ("TVs"), and mobile phones. An ultimate goal of a 3D display is to give users the same stereoscopic experience they experience in a real world, and to achieve the goal, many kinds of technologies such as stereo and multi-viewpoint methods are being studied. Among the technologies, the light field method can more accurately reproduce 3D spatial information.

Light generated in a display panel may pass through a lens to form a light field. Recently, researches on changing a lens arrangement method (e.g., tilt) in order to improve display quality of a 3D image have been conducted.

SUMMARY

Exemplary embodiments of the invention provide a display module having a lens array method suitable for the pixel array method of the display panel and a display device including the same.

An exemplary embodiment of the invention provides a display module including a display panel including a plurality of pixels including a first type pixel, a second type pixel, and a third type pixel, and a lens array disposed on a first surface of the display panel and having an inclination angle, where the first type pixel and the second type pixel are disposed adjacent to each other in a second direction, where the third type pixel is disposed adjacent to the first type pixel and the second type pixel in a first direction, where a pitch of the third type pixel in the second direction is less than or equal to a sum of a pitch of the first type pixel in the second direction and a pitch of the second type pixel in the second direction.

In an exemplary embodiment, the inclination angle of the lens array may be determined by a value calculated by $$\tan^{-1}\left(\frac{Rb + Bb}{n \times Ra + m \times Ga}\right),$$

where Ra may be a first pitch of the first type pixel in the second direction, where Rb may be a second pitch of the first type pixel in the first direction, where Ga may be a third pitch of the second type pixel in the second direction, where Bb may be a fourth pitch of the third type pixel in the first direction, where n may be a natural number and m may be zero or a natural number.

In an exemplary embodiment, a fifth pitch of the third type pixel in the second direction may be greater than any one of the first pitch of the first type pixel and the third pitch of the second type pixel, where the fifth pitch may be less than or equal to the sum of the first pitch and the third pitch.

In an exemplary embodiment, when the first pitch, the second pitch, the third pitch, and the fourth pitch are equal to each other, the inclination angle may be determined by a value calculated by $$A = \tan^{-1}\left(\frac{2}{n+m}\right).$$

In an exemplary embodiment, n and m may be different natural numbers from each other.

In an exemplary embodiment, the lens array may include a plurality of lens units arranged in the first direction, where each of the plurality of lens units may correspond to k pixels (k is a natural number) arranged in the first direction among the plurality of pixels.

In an exemplary embodiment, the k pixels, which correspond to any one of the plurality of lens units and are arranged in the first direction, respectively correspond to any one of k viewpoints.

In an exemplary embodiment, the first type pixel and the second type pixel adjacent in the second direction may correspond to a same viewpoint or different viewpoints.

In an exemplary embodiment, the first type pixel and the second type pixel may correspond to a viewpoint different from the third type pixel.

In an exemplary embodiment, the lens array may include a lenticular lens array

In an exemplary embodiment, the first type pixel may emit red light, the second type pixel emits green light, and the third type pixel emits blue light.

In an exemplary embodiment of the invention, a display device includes a display panel including a plurality of pixels including a first type pixel, a second type pixel, and a third type pixel, a lens array disposed on a first surface of the display panel and having an inclination angle, and a panel driving circuit which receives an input image signal and provides an output image signal to the display panel, where the first type pixel and the second type pixel are disposed adjacent to each other in a second direction, where the third type pixel is disposed adjacent to the first type pixel and the second type pixel in a first direction, wherein the inclination angle is determined by a value calculated by $$A = \tan^{-1}\left(\frac{Rb + Bb}{n \times Ra + m \times Ga}\right),$$

where Ra is a first pitch of the first type pixel in a second direction, where Rb is a second pitch of the first type pixel in a first direction, where Ga is a third pitch of the second type pixel in the second direction, where Bb is a fourth pitch of the third type pixel in the first direction, where n is a natural number and m is 0 or a natural number In an exemplary embodiment, the input image signal may include a plurality of viewpoint image signals corresponding to a plurality of viewpoints, respectively.

In an exemplary embodiment, the panel driving circuit may include a viewpoint re-arrangement unit which outputs viewpoint re-arrangement image signals in which the plurality of viewpoint image signals is rearranged in a viewpoint order corresponding to the inclination angle of the lens array, and an output conversion unit which converts the viewpoint re-arrangement image signals into the output image signal suitable for a pixel arrangement structure of the display panel.

In an exemplary embodiment, the first pitch and the second pitch of the first type pixel, the third pitch of the second type pixel, and the fourth pitch of the third type pixel may be equal to each other.

In an exemplary embodiment, when the first pitch and the second pitch, and the third pitch and the fourth pitch are equal to each other, the inclination angle may be determined by a value calculated by $$\tan^{-1} = \left(\frac{2}{n+m}\right).$$

In an exemplary embodiment, the lens array may include a plurality of lens units arranged in the first direction, where each of the plurality of lens units may correspond to k pixels (k is a natural number) arranged in the first direction among the plurality of pixels.

In an exemplary embodiment, the k pixels, which correspond to any one of the plurality of lens units and are arranged in the first direction, respectively may correspond to any one of k viewpoints.

In an exemplary embodiment, the lens array may include a lenticular lens array

In an exemplary embodiment, the first type pixel may emit red light, the second type pixel may emit green light, and the third type pixel may emit blue light.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
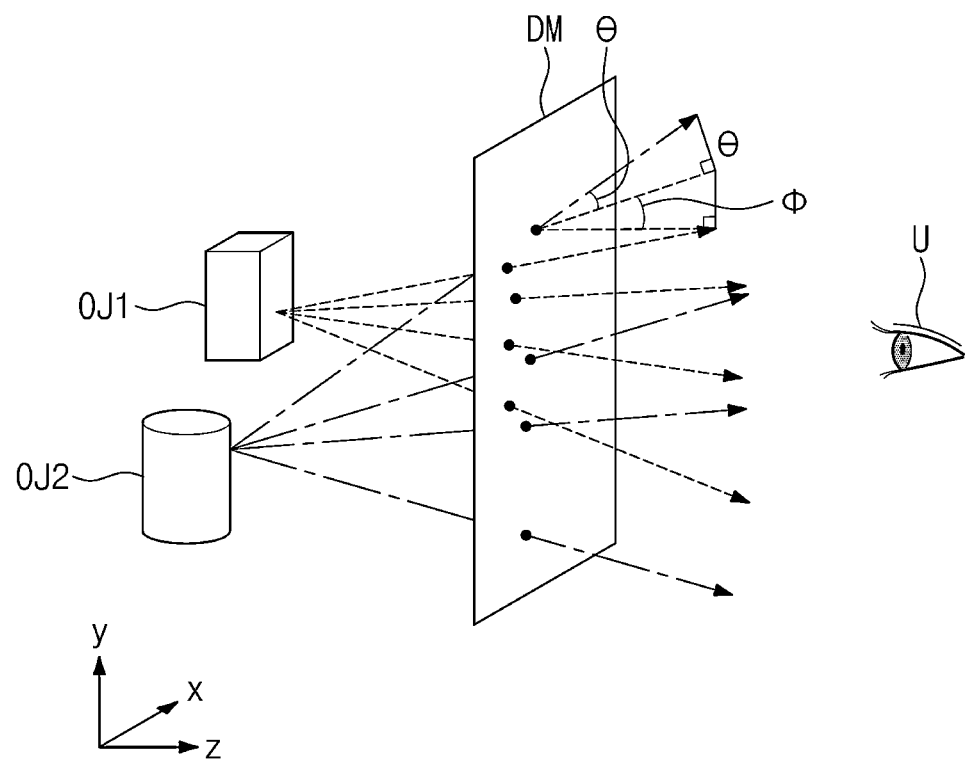
FIG. 1 is a diagram illustrating a user watching a stereoscopic image through a display module by way of example.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another. A first component may be referred to as a second component and vice versa without departing from the scope of the invention, for example. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

In various embodiments of the invention, the term "include," "comprise," "including," or "comprising," specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as terms commonly understood by those skilled in the art to which this invention belongs. In general, the terms defined in the dictionary should be considered to have the same meaning as the contextual meaning of the related art, and, unless clearly defined herein, should not be understood abnormally or as having an excessively formal meaning.

Hereinafter, another exemplary embodiment of the invention will be described with reference to the drawings.

FIG. 1 is a diagram illustrating a user watching a stereoscopic image through a display module DM by way of example.

Referring to FIG. 1, a 'light field' is a concept of expressing a state in which light is distributed in space through a distribution of light rays. Using this concept, light reflected or generated from an object is defined as entering the human eye by going straight through the space, and the three-dimensional ("3D") space may be composed of a large number of light fields. In an exemplary embodiment, a five-dimensional Plenoptic function (I(x, y, z, θ, φ)) may be used to mathematically express individual light fields, for example. That is, the light field may be expressed as a luminance with respect to the 3D space coordinates x, y, and z of the point where the light ray passes through the plane on the predetermined plane in space and the spatial direction angles θ and φ to which the light ray faces. The light field may be captured by making information with the Plenoptic function value of light passing through the predetermined plane. That is, the light field may be captured by a luminance value for each of the angles θ and φ for each of the coordinates x, y, and z of a predetermined area.

That is, the direction of the light ray generated by the display module DM forms a light field facing a specific direction (observation viewpoint), and the user U may view the objects OJ1 and OJ2 as 3D images based on the stereoscopic image information corresponding to the ray direction.

Figure 2:
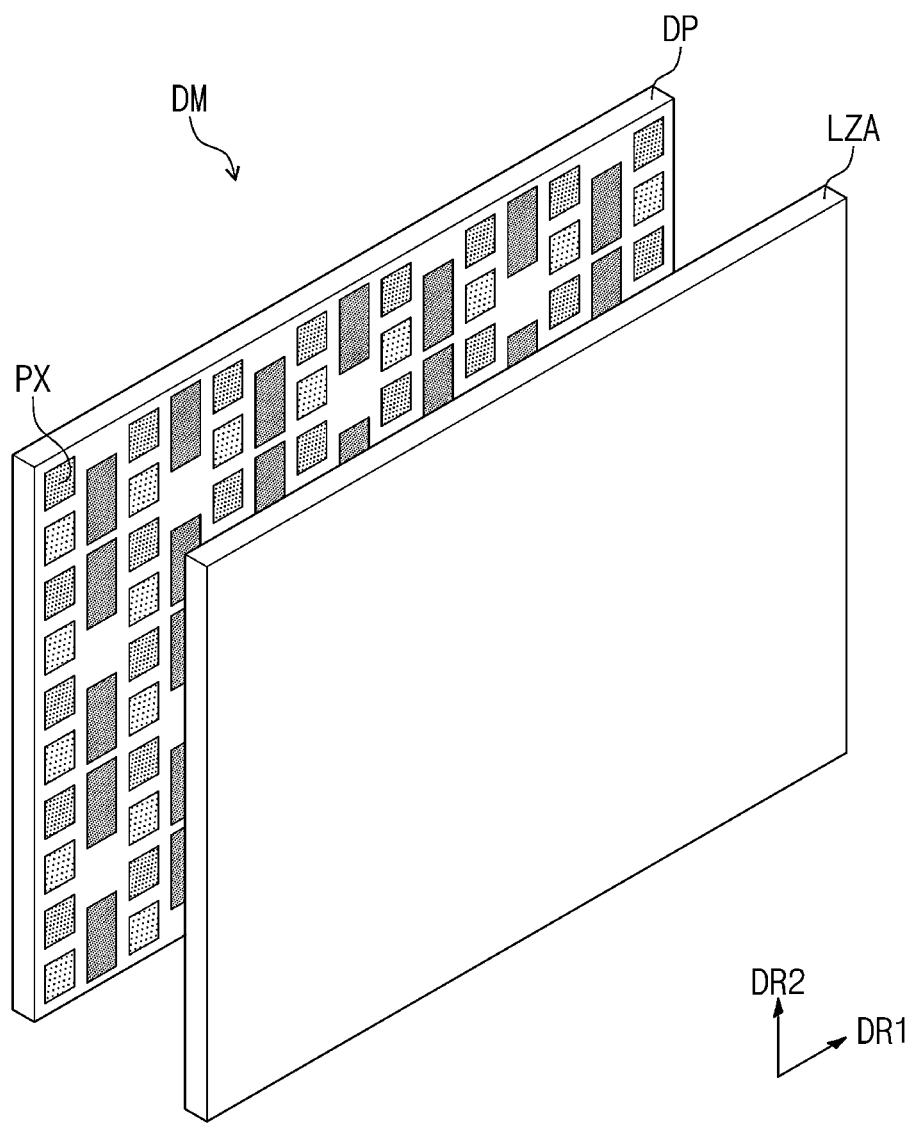
FIG. 2 is an exploded perspective view briefly illustrating an exemplary embodiment of a display module according to the invention.

FIG. 2 is an exploded perspective view briefly illustrating an exemplary embodiment of a display module according to the invention.

Referring to FIG. 2, the display module DM may include a display panel DP and a lens array LZA. In this exemplary embodiment, the display module DM may be a light field display module.

The display panel DP may include a plurality of pixels PX. The plurality of pixels PX may include, for example, a first type pixel, a second type pixel, and a third type pixel. In addition, the first type pixel may be a pixel emitting red light, the second type pixel may be a pixel emitting green light, and the third type pixel may be a pixel emitting blue light. However, the invention is not limited thereto, and the first to third type pixels may emit different color lights. The pixels PX may be arranged in a matrix in a first direction DR1 and in a second direction DR2 that is substantially perpendicular to the first direction DR1. However, the invention is not limited thereto, and the PX may be arranged in various other forms. The display panel DP may be a plasma display panel, a liquid crystal display panel, an organic light emitting display panel, or the like. The first direction DR1 and the second direction DR2 illustrated in FIG. 2 may correspond to x and y of the spatial coordinates illustrated in FIG. 1, respectively.

The lens array LZA is disposed on the first surface of the display panel DP. In an exemplary embodiment, the lens array LZA may be disposed on an upper surface of the display panel DP. That is, the lens array LZA may be disposed adjacent to a surface from which the light of the display panel DP is emitted.

Figure 3:
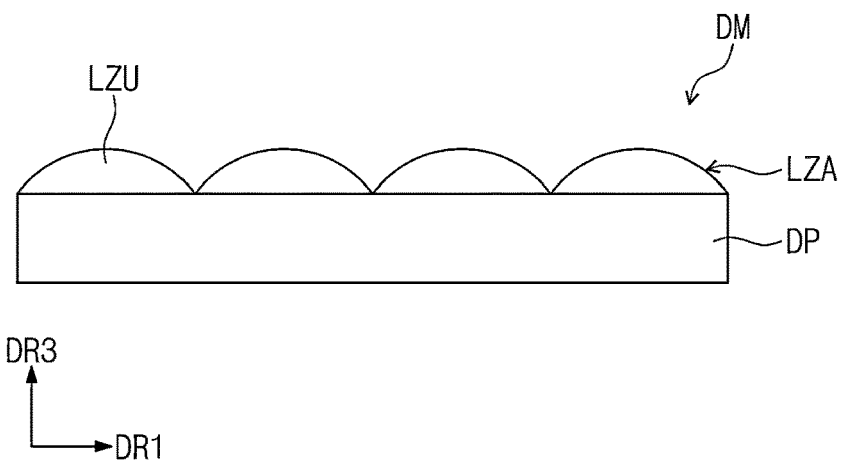
FIG. 3 is a diagram illustrating a cross section of a display module by way of example.

FIG. 3 is a diagram illustrating a cross section of a display module by way of example.

Referring to FIGS. 2 and 3, the lens array LZA is disposed on an upper surface of the display panel DP. The lens array LZA may include a plurality of lens units LZU. Light generated in the pixels PX of the display panel DP may pass through the lens units LZU of the lens array LZA to form a light field.

Each of the lens units LZU may be composed of an active lens. That is, the lens units LZU may generate an electric field by the voltage applied to the electrodes constituting the lens units LZU, thereby modifying the arrangement of the liquid crystal molecules.

The lens units LZU allow the image displayed on the display panel DP to be transmitted as it is in the two-dimensional ("2D") display mode, and in the 3D display mode, allows a multi-viewpoint image outputted from the display panel DP to form an image in a viewpoint area corresponding to each viewpoint image by light diffraction and refraction.

An arrangement of the pixels PX of the display panel DP to form a light field, an arrangement of the lens units LZU constituting the lens array LZA, and a relative positional relationship of the pixels PX and the lens units LZU may be variously changed.

In the following description, the lens units LZU are described as lenticular lenses, but the invention is not limited thereto. In other exemplary embodiments, the lens units LAU may be micro lenses, and the shapes of the micro lenses may have various shapes such as circles, polygons, and the like.

Figure 4:
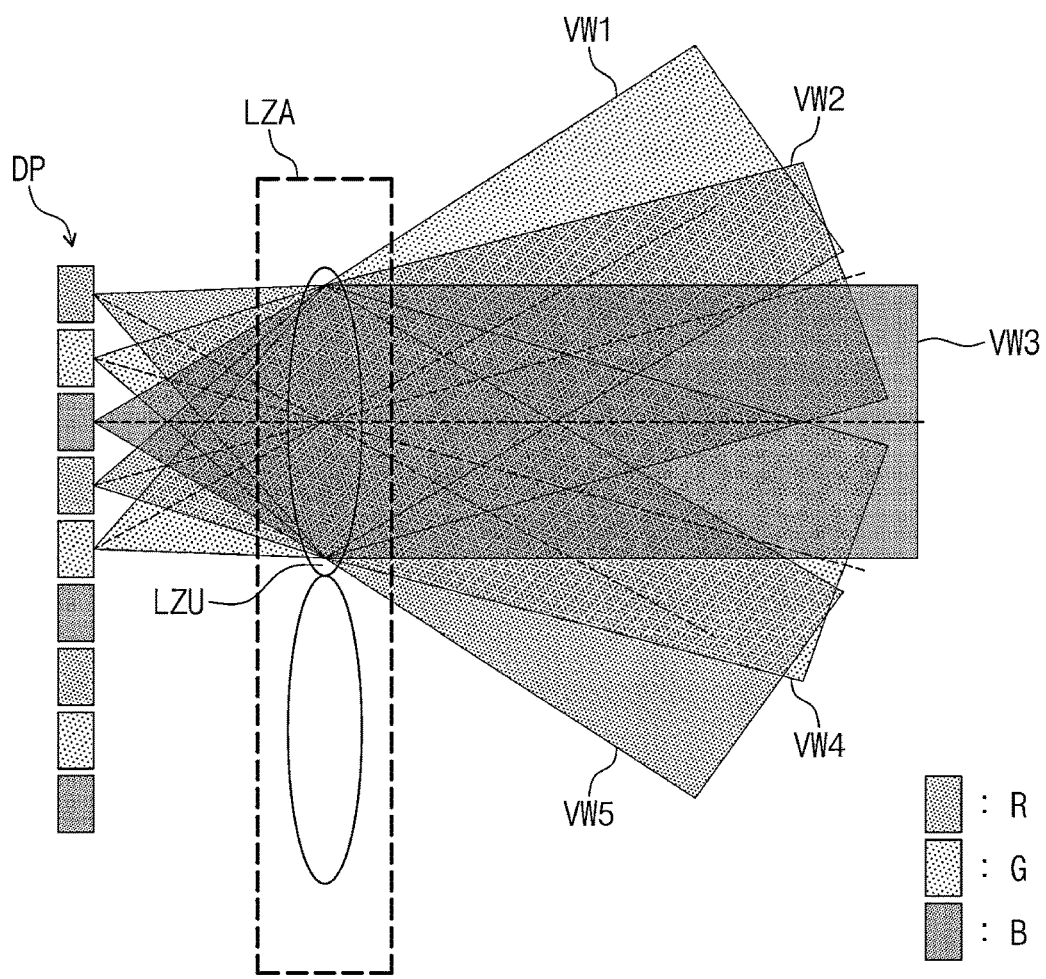
FIG. 4 is a diagram illustrating a multi-viewpoint display method of a display module.

FIG. 4 is a diagram illustrating a multi-viewpoint display method of a display module.

Referring to FIG. 4, the display panel DP includes a plurality of pixels PX. The lens array LZA includes lens units LZU. One lens unit LZU may correspond to the plurality of pixels PX. In the example shown in FIG. 4, one lens unit LZU corresponds to five pixels PX. In addition, the five pixels PX may output light corresponding to image signals of different viewpoints. Light outputted from the pixels PX may be diffracted and/or refracted through the lens unit LZU to form different light fields, and thus, display the 3D image of the first to fifth viewpoints VW1 to VW5.

The number of pixels PX corresponding to one lens unit LZU, and the size and arrangement order of each of the pixels PX may be variously changed.

Figure 5:
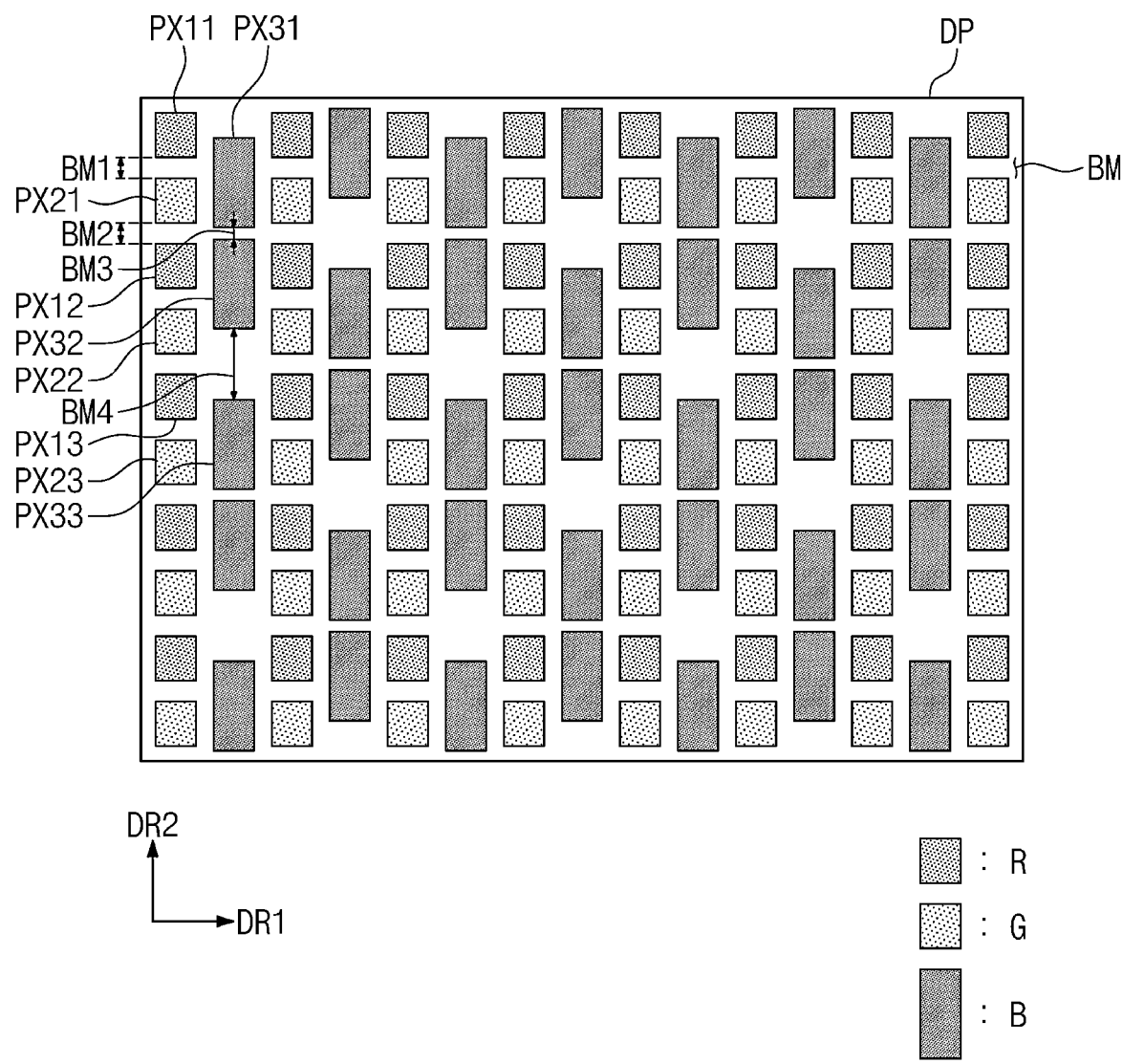
FIG. 5 is a diagram illustrating a pixel arrangement of a display panel as an example.

FIG. 5 is a diagram illustrating a pixel arrangement of a display panel as an example.

Referring to FIG. 5, the display panel DP includes a plurality of pixels PX. The plurality of pixels may include first type pixels PX11, PX12, and PX13, second type pixels PX21, PX22, and PX23, and third type pixels PX31, PX32, and PX33. The remaining area other than the area where the first type pixels PX11, PX12, and PX13, the second type pixels PX21, PX22, and PX23, and the third type pixels PX31, PX32, and PX33 of the display panel DP are disposed may be a black matrix BM. The black matrix BM blocks unnecessary light in implementing an image. The black matrix BM blocks color combination that may appear at the edges of the pixels. Signal wirings may be disposed under the black matrix BM.

The first type pixels PX11, PX12, and PX13 may be pixels emitting red light R. The second type pixels PX21, PX22, and PX23 may be pixels emitting green light G. The third type pixels PX31, PX32, and PX33 may be pixels emitting blue light B.

The first type pixels PX11, PX12, and PX13 and the second type pixels PX21, PX22, and PX23 are adjacent to each other in the second direction DR2. The first type pixels PX11, PX12, and PX13 and the second type pixels PX21, PX22, and PX23 may be alternately arranged one by one in the second direction DR2.

The third type pixel PX31 is disposed adjacent to the first type pixel PX11 and the second type pixel PX21 in the first direction DR1. The third type pixel PX32 is disposed adjacent to the first type pixel PX12 and the second type pixel PX22 in the first direction DR1. The third type pixel PX33 is disposed adjacent to the first type pixel PX13 and the second type pixel PX23 in the first direction DR1.

In an exemplary embodiment, the first type pixels PX11, PX12, and PX13 and the second type pixels PX21, PX22, and PX23 have the same length in the first direction DR1 and the same length in the second direction DR2. The length of each of the third type pixels PX31, PX32, and PX33 in the second direction DR2 is longer than the length of the first type pixels PX11, PX12, and PX13 and the second type pixels PX21, PX22, and PX23 in the second direction DR2. That is, the area of each of the third type pixels PX31, PX32, and PX33 is larger than the area of each of the first type pixels PX11, PX12, and PX13 and the second type pixels PX21, PX22, and PX23.

In an exemplary embodiment, the first separation distance BM1 in the second direction DR2 between the first type pixel PX11 and the second type pixel PX21 is substantially the same as the second separation distance BM2 in the second direction DR2 between the second type pixel PX21 and the first type pixel PX12.

In an exemplary embodiment, the fourth separation distance BM4 in the second direction DR2 between the third type pixel PX32 and the third type pixel PX33 is larger than the third separation distance BM3 in the second direction DR2 between the third type pixel PX31 and the third type pixel PX32. That is, separation distances between the third type pixels PX31, PX32, and PX33 may be different from each other.

The pixel arrangement structure of the display panel DP as shown in FIG. 5 may be referred to as an "S-stripe structure". Since the display panel DP of an S-stripe structure has a high aperture ratio, it may be used in a vehicle display device. The vehicle may include a navigation display device for navigation display or a door mirror (or side mirror) display device for displaying the rear of the vehicle. The navigation display device or the door mirror display device may provide a 3D image to a user.

In the following description, for easy identification, the first type pixel is represented by PX1, the second type pixel is PX2, and the third type pixel is represented by PX3.

Figure 6A:
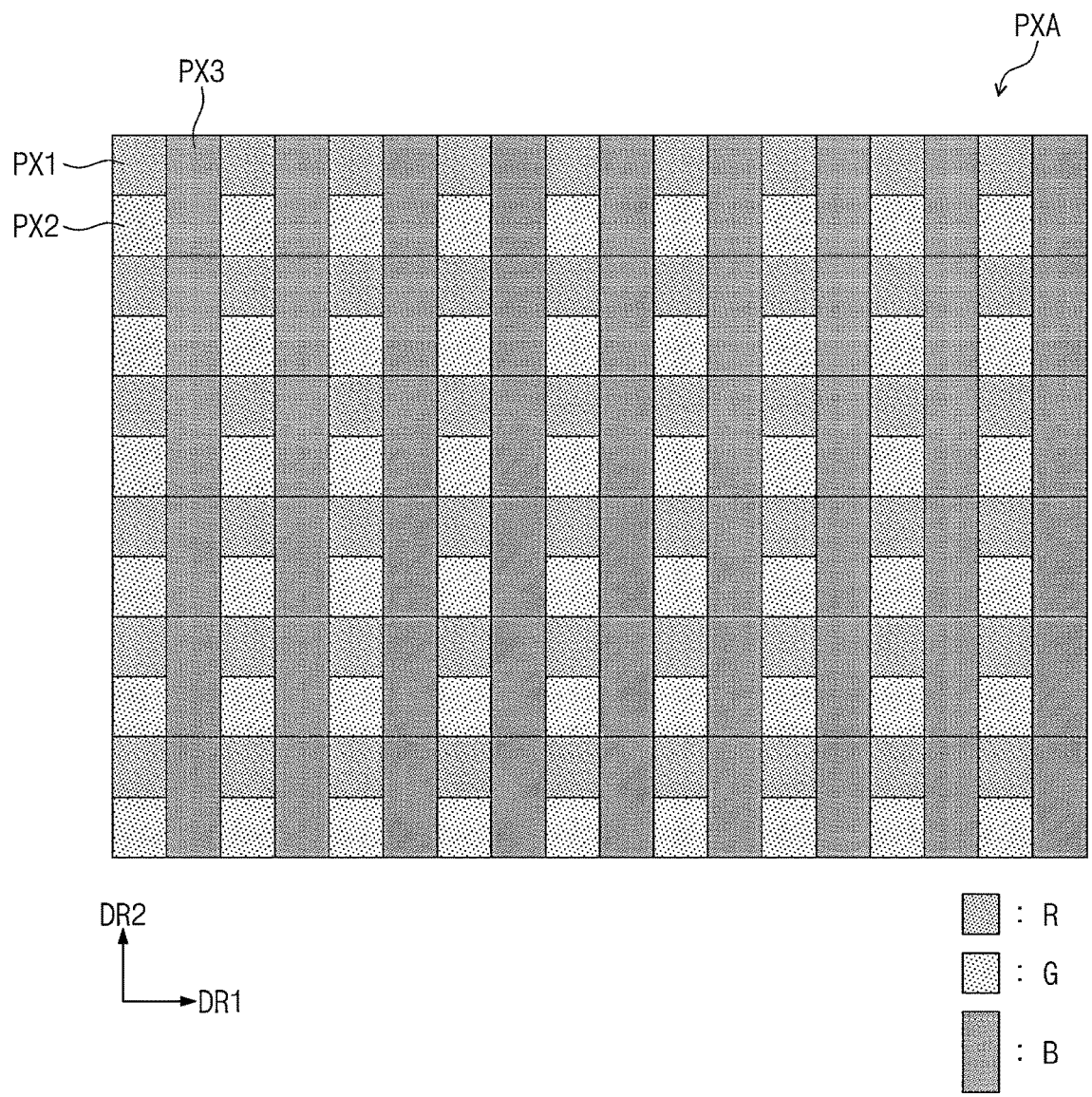
FIG. 6A is a diagram illustrating an example of configuring a pixel array using the first to third type pixels illustrated in FIG. 5.

FIG. 6A illustrates an example in which the pixel array PXA is configured using only the first to third type pixels PX1, PX2, and PX3 except for the black matrix BM of the display panel DP illustrated in FIG. 5.

Figure 6B:
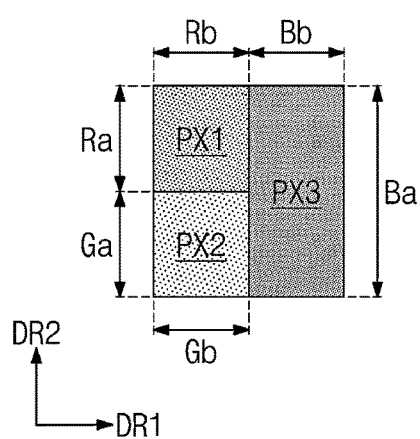
FIG. 6B is an enlarged view of first to third type pixels shown in FIG. 6A.

FIG. 6B is an enlarged view of the first to third type pixels PX1, PX2, and PX3 shown in FIG. 6A.

Referring to FIGS. 6A and 6B, the first type pixel PX1 has a first pitch Ra in a second direction DR2 and a second pitch Rb in a first direction DR1. The first pitch Ra may refer to the length of the first type pixel PX1 in the second direction DR2, and the second pitch Rb may refer to the length of the first type pixel PX1 in the first direction DR1. In addition, the first pitch Ra may refer to a distance between the center of the first type pixel PX1 and the center of the second type pixel PX2 in the second direction DR2. In this case, the first pitch Ra may refer to a sum of the length of the first type pixel PX1 in the second direction DR2 and the first separation distance BM1 (refer to FIG. 5). The second pitch Rb may refer to a distance between the center of the first type pixel PX1 and the center of the third type pixel PX3 in the first direction DR1.

The second type pixel PX2 has a third pitch Ga in the second direction DR2 and a sixth pitch Gb in the first direction DR1. The third pitch Ga may refer to the length of the second type pixel PX2 in the second direction DR2, and the sixth pitch Gb may refer to the length of the second type pixel PX2 in the first direction DR1. In addition, the third pitch Ga may refer to a distance between the center of the second type pixel PX2 and the center of the first type pixel PX1 in the second direction DR2. The sixth pitch Gb may refer to a distance between the center of the second type pixel PX2 and the center of the third type pixel PX3 in the first direction DR1.

The third type pixel PX3 has a fourth pitch Bb in the first direction DR1 and a fifth pitch Ba in the second direction DR2. The fourth pitch Bb may refer to the length of the third type pixel PX3 in the first direction DR1, and the fifth pitch Ba may refer to the length of the third type pixel PX3 in the second direction DR2. In addition, the fourth pitch Bb may refer to a distance between the center of the third type pixel PX3 and the center of the first type pixel PX1 in the first direction DR1. The fifth pitch Ba may mean a distance between centers of two adjacent third type pixels PX3 in the second direction DR2.

The fifth pitch Ba is greater than each of the first pitch Ra and the third pitch Ga, and is less than or equal to the sum of the first pitch Ra and the third pitch Ga. In the example shown in FIG. 5, it is shown that the length of each of the third type pixels PX31, PX32, and PX33 in the second direction DR2 is less than the sum of lengths of a corresponding first type pixel among the first type pixels PX11, PX12, and PX13 and a corresponding second type pixel among the second type pixels PX21, PX22, and PX23 in the second direction DR2. In FIGS. 6A and 6B, it is assumed that the length of the third type pixel PX3 in the second direction DR2, that is, the fifth pitch Ba, is equal to the sum of the first pitch Ra and the third pitch Ga. When the fifth pitch Ba refers to the distance between the centers of two adjacent third type pixels PX3, the fifth pitch Ba may be equal to the sum of the first pitch Ra and the third pitch Ga.

Figure 7:
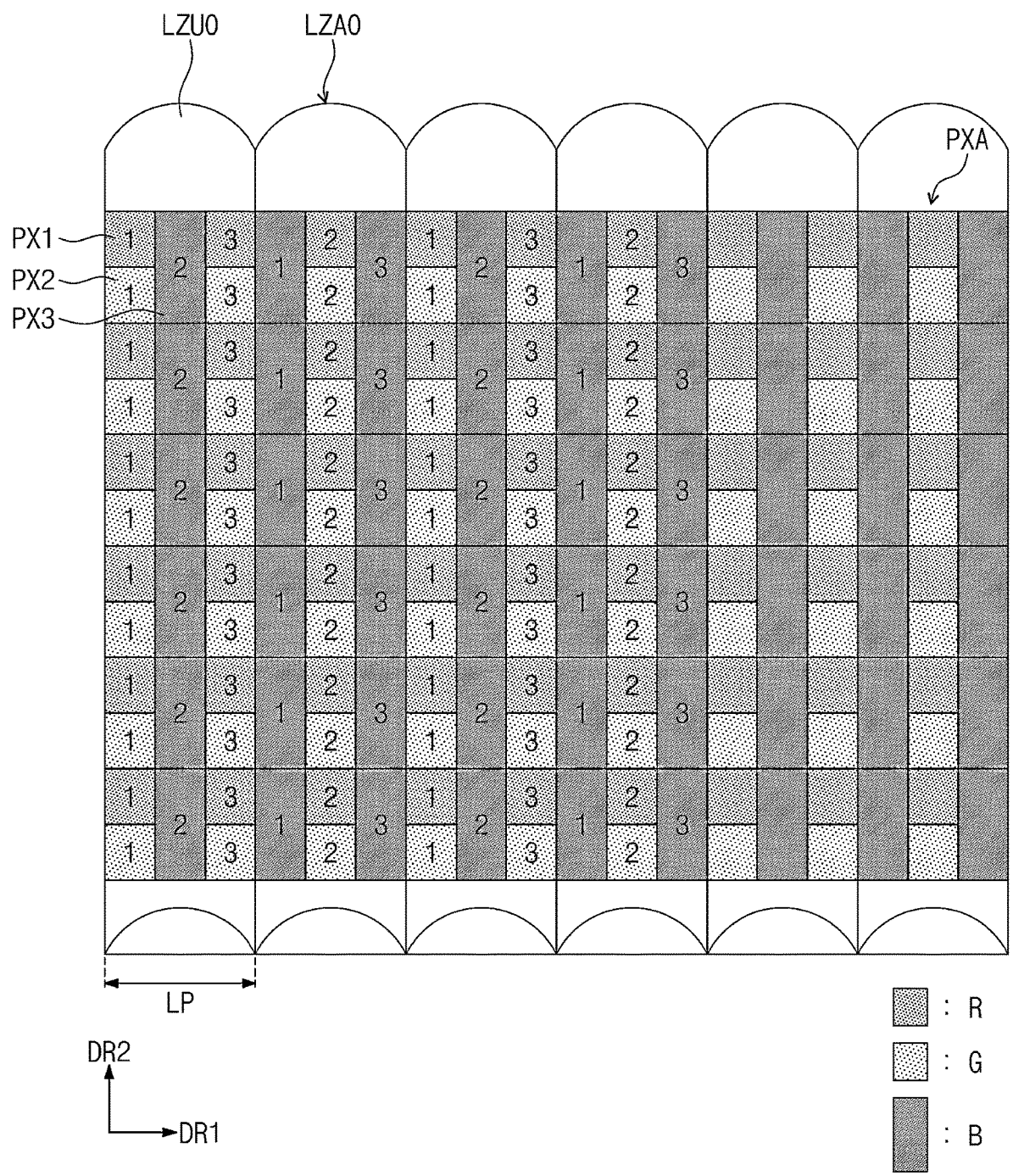
FIG. 7 exemplarily illustrates that a lens array is overlapped with the pixel array illustrated in FIG. 6A.

FIG. 7 exemplarily illustrates that the lens array LZA0 is overlapped with the pixel array PXA illustrated in FIG. 6A.

Referring to FIG. 7, the lens array LZA0 includes a plurality of lens units LZU0 arranged in the first direction DR1. Each of the lens units LZU0 of the lens array LZA0 overlaps three pixels in the first direction DR1. That is, since one lens unit LZU0 corresponds to three pixels in the first direction DR1, the pitch LP of the lens unit LZU0 may be 3×Rb (refer to FIG. 6B) when the second pitch Rb, the sixth pitch Gb and the fourth pitch Bb are equal to one another (i.e., Rb=Gb=Bb).

In FIG. 7, numbers indicated in the first to third type pixels PX1, PX2, and PX3 represent viewpoint numbers of image signals to be provided to the first to third type pixels PX1, PX2, and PX3. In an exemplary embodiment, the number '1' indicated in the first type pixel PX1 refers to an image signal corresponding to the first viewpoint, for example. The number '3' indicated in the third type pixel PX3 refers to an image signal corresponding to the third viewpoint.

In the exemplary embodiment shown in FIG. 7, the pixel array PXA is illustrated and described as being capable of outputting image signals corresponding to the first to third viewpoints, but the invention is not limited thereto. In an exemplary embodiment, the pixel array PXA may output image signals corresponding to k viewpoints (k is a natural number), for example. In this case, one lens unit LZU0 may be disposed to correspond to k pixels in the first direction DR1.

In the example shown in FIG. 7, one third of the first to third type pixels PX1, PX2, and PX3 constituting the pixel array PXA provides an image signal of a first viewpoint, one third provides an image signal of a second viewpoint, and one third provides an image signal of a third viewpoint. That is, since the resolution of each viewpoint is only one third of the number of pixels, the resolution of the 3D image is lowered.

Figure 8:
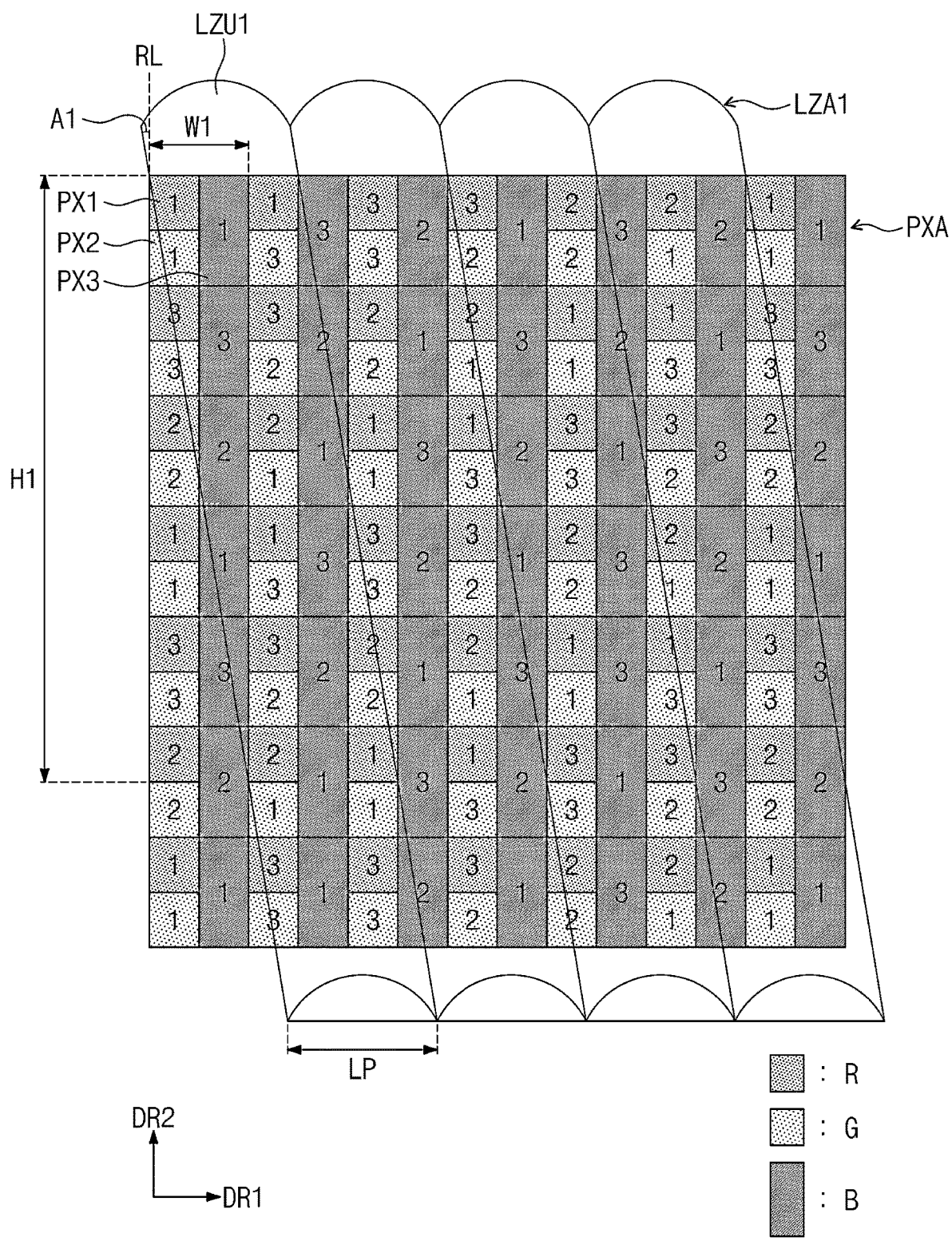
FIG. 8 exemplarily illustrates that a first lens array is overlapped with the pixel array illustrated in FIG. 6A.

FIG. 8 exemplarily illustrates that the first lens array LZA1 is overlapped with the pixel array PXA illustrated in FIG. 6A.

Referring to FIG. 8, each of the first lens units LZU1 of the first lens array LZA1 may have a shape inclined at a first inclination angle A1 with respect to the reference line RL. The reference line RL may be an imaginary line parallel to the second direction DR2 perpendicular to the first direction DR1. The pitch LP of the first lens unit LZU1 may be 3×Rb (refer to FIG. 6B) when the second pitch Rb, the sixth pitch Gb and the fourth pitch Bb are equal to one another (i.e., Rb=Gb=Bb).

The inclination angle A1 may be calculated by Equation 1.

$$A1 = \tan^{-1}\left(\frac{Rb + Bb}{n \times Ra + m \times Ga}\right) \quad \text{[Equation 1]}$$

As described with reference to FIG. 6B, Ra is a first pitch of the first type pixel PX1 in the second direction DR2, Rb is a second pitch of the first type pixel PX1 in the first direction DR1, Ga is a third pitch of the second type pixel PX2 in the second direction DR2, and Bb is a fourth pitch of the third type pixel PX3 in the first direction DR1. In addition, n is a natural number, and m is 0 or a natural number. n is the number of the first type pixels PX1 in the second direction DR2, and m is the number of the second type pixels PX2 in the second direction DR2.

Assuming that Ra=Rb=Ga=Bb, when n=6 and m=5, the inclination angle A1 is expressed by Equation 2 below.

$$A1 = \tan^{-1}\left(\frac{2}{11}\right) = 10.3^0 \quad \text{[Equation 2]}$$

In FIG. 8, H1=11 and W1=2 correspond to the inclination angle A1=$\tan^{-1}$(2/11).

H1 is the number of pixels arranged in the second direction DR2 corresponding to $\tan^{-1}$(2/11) and W1 is the number of pixels arranged in the first direction DR1 corresponding to $\tan^{-1}$(2/11).

Figure 9:
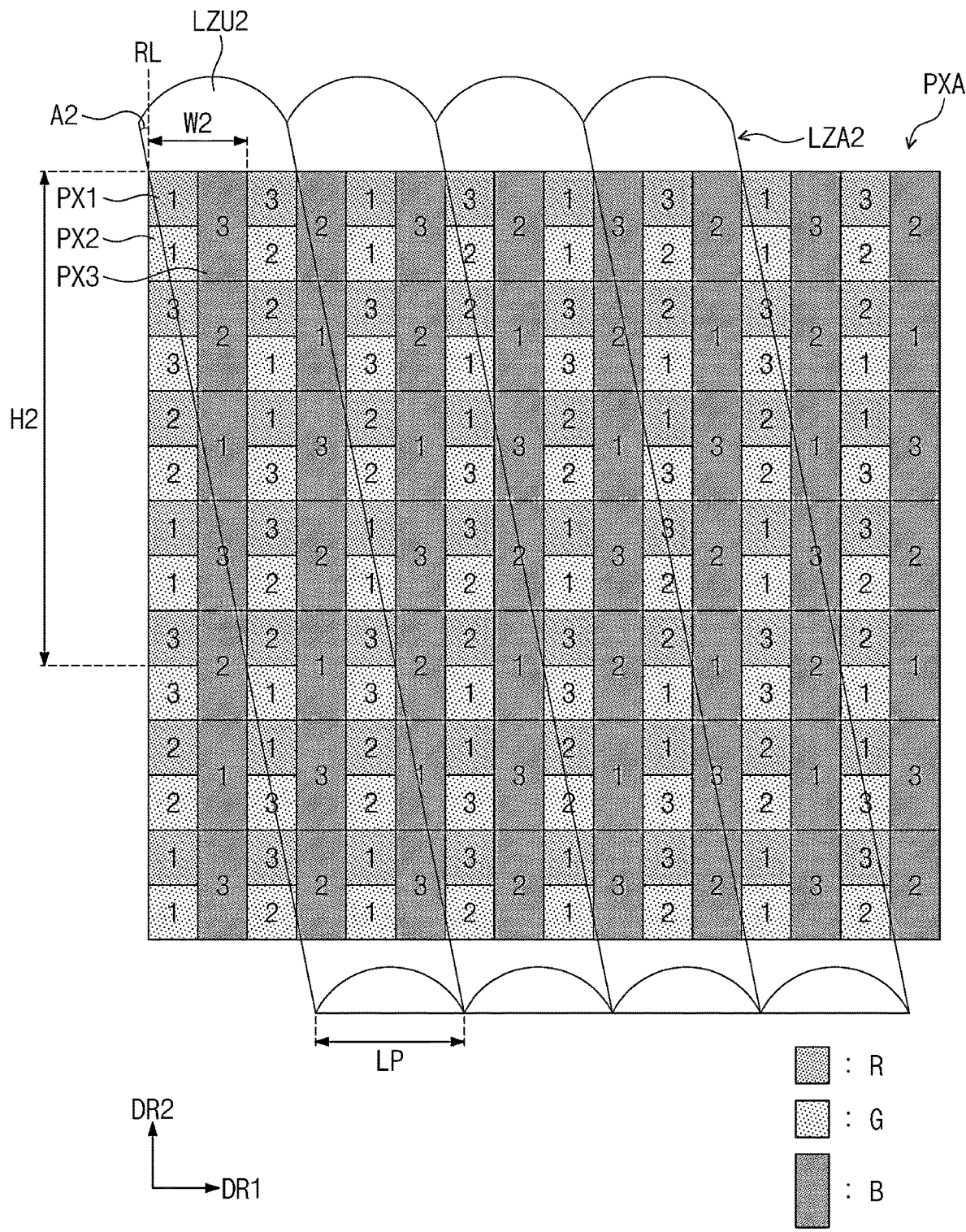
FIG. 9 exemplarily illustrates that a second lens array is overlapped with the pixel array illustrated in FIG. 6A.

FIG. 9 exemplarily illustrates that the second lens array LZA2 is overlapped with the pixel array PXA illustrated in FIG. 6A.

Referring to FIG. 9, each of the second lens units LZU2 of the second lens array LZA2 may have a shape inclined at a second inclination angle A2 with respect to the reference line RL. The reference line RL may be an imaginary line parallel to the second direction DR2 perpendicular to the first direction DR1. The pitch LP of the second lens unit LZU2 may be 3×Rb (refer to FIG. 6B) when the second pitch Rb, the sixth pitch Gb and the fourth pitch Bb are equal to one another (i.e., Rb=Gb=Bb).

Assuming that Ra=Rb=Ga=Bb in Equation 1, the inclination angle A2 is equal to Equation 3 when n=5 and m=4.

$$A1 = \tan^{-1}\left(\frac{2}{9}\right) = 12.53^0 \quad \text{[Equation 3]}$$

In FIG. 9, H2=9 and W2=2 correspond to the inclination angle A2=$\tan^{-1}$(2/9).

H2 is the number of pixels arranged in the second direction DR2 corresponding to $\tan^{-1}$(2/9) and W2 is the number of pixels arranged in the first direction DR1 corresponding to $\tan^{-1}$(2/9).

Figure 10:
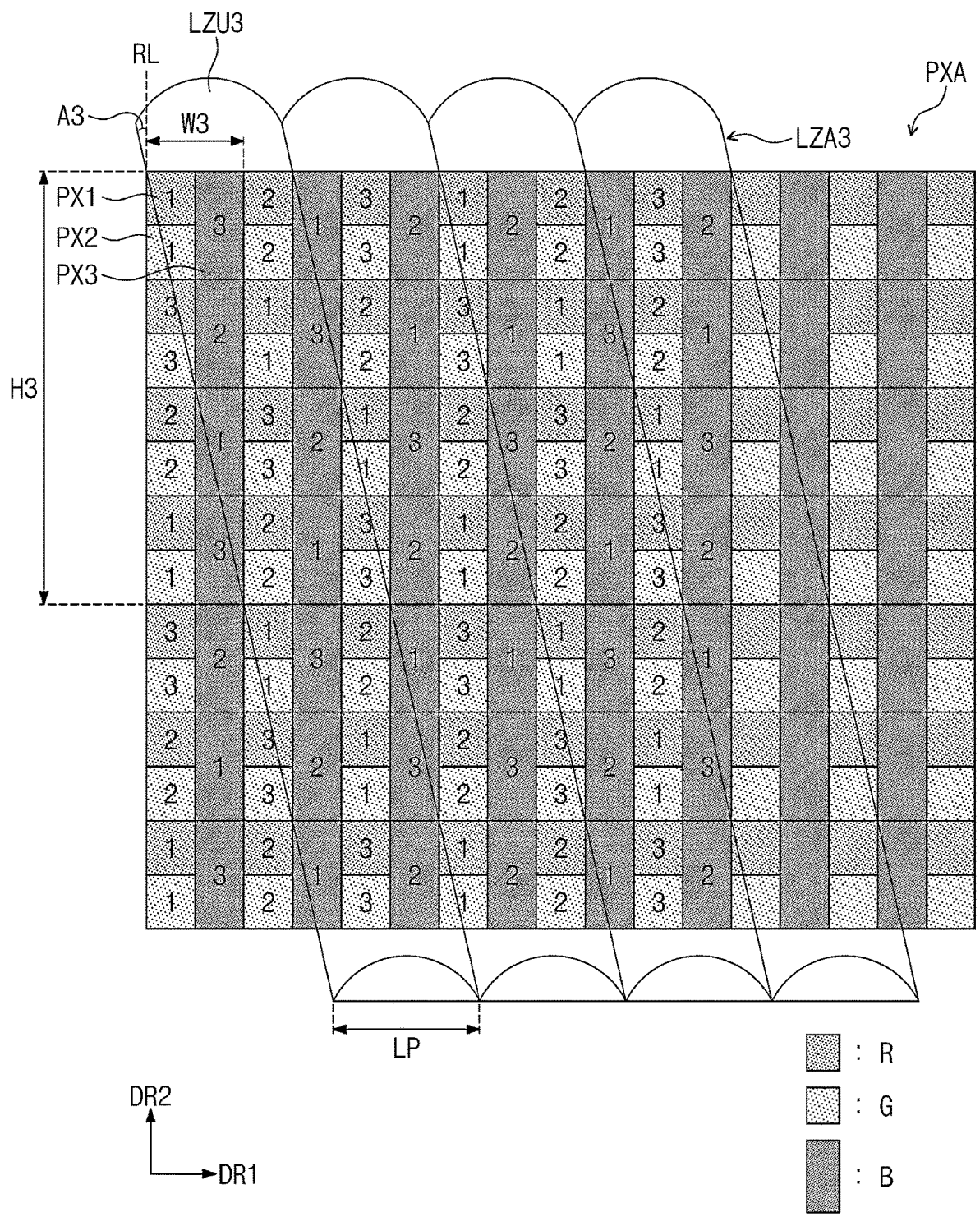
FIG. 10 exemplarily illustrates that a third lens array is overlapped with the pixel array illustrated in FIG. 6A.

FIG. 10 exemplarily illustrates that the third lens array LZA3 is overlapped with the pixel array PXA illustrated in FIG. 6A.

Referring to FIG. 10, each of the third lens units LZU3 of the third lens array LZA3 may have a shape inclined at a third inclination angle A3 with respect to the reference line RL. The reference line RL may be an imaginary line parallel to the second direction DR2 perpendicular to the first direction DR1. The pitch LP of the third lens unit LZU3 may be 3×Rb (refer to FIG. 6B) when the second pitch Rb, the sixth pitch Gb and the fourth pitch Bb are equal to one another (i.e., Rb=Gb=Bb).

Assuming that Ra=Rb=Ga=Bb in Equation 1, the inclination angle A3 is equal to Equation 4 when n=4 and m=4.

$$A3 = \tan^{-1}\left(\frac{2}{8}\right) = 14.04^0 \quad \text{[Equation 4]}$$

In FIG. 10, H3=8 and W3=2 correspond to the inclination angle A3=$\tan^{-1}$(2/8).

H3 is the number of pixels arranged in the second direction DR2 corresponding to $\tan^{-1}$(2/8) and W3 is the number of pixels arranged in the first direction DR1 corresponding to $\tan^{-1}$(2/8).

As described with reference to FIGS. 8 to 10, it is assumed that Ra=Rb=Ga=Bb in Equation 1, and the inclination angle A may be set by setting n and m. Furthermore, In FIGS. 8 to 10, numbers indicated in the first to third type pixels PX1, PX2, and PX3 represent viewpoint numbers of image signals to be provided to the first to third type pixels PX1, PX2, and PX3. By optimizing the viewpoint of the image signal to be provided to the first to third type pixels PX1, PX2, and PX3 according to the inclination angles A1, A2, and A3 of the first to third lens arrays LZA1, LAZ2, and LZA3, the display module DM may display an optimal 3D image. Here, n and m are natural numbers, and n and m may be the same as or different from each other.

Figure 11:
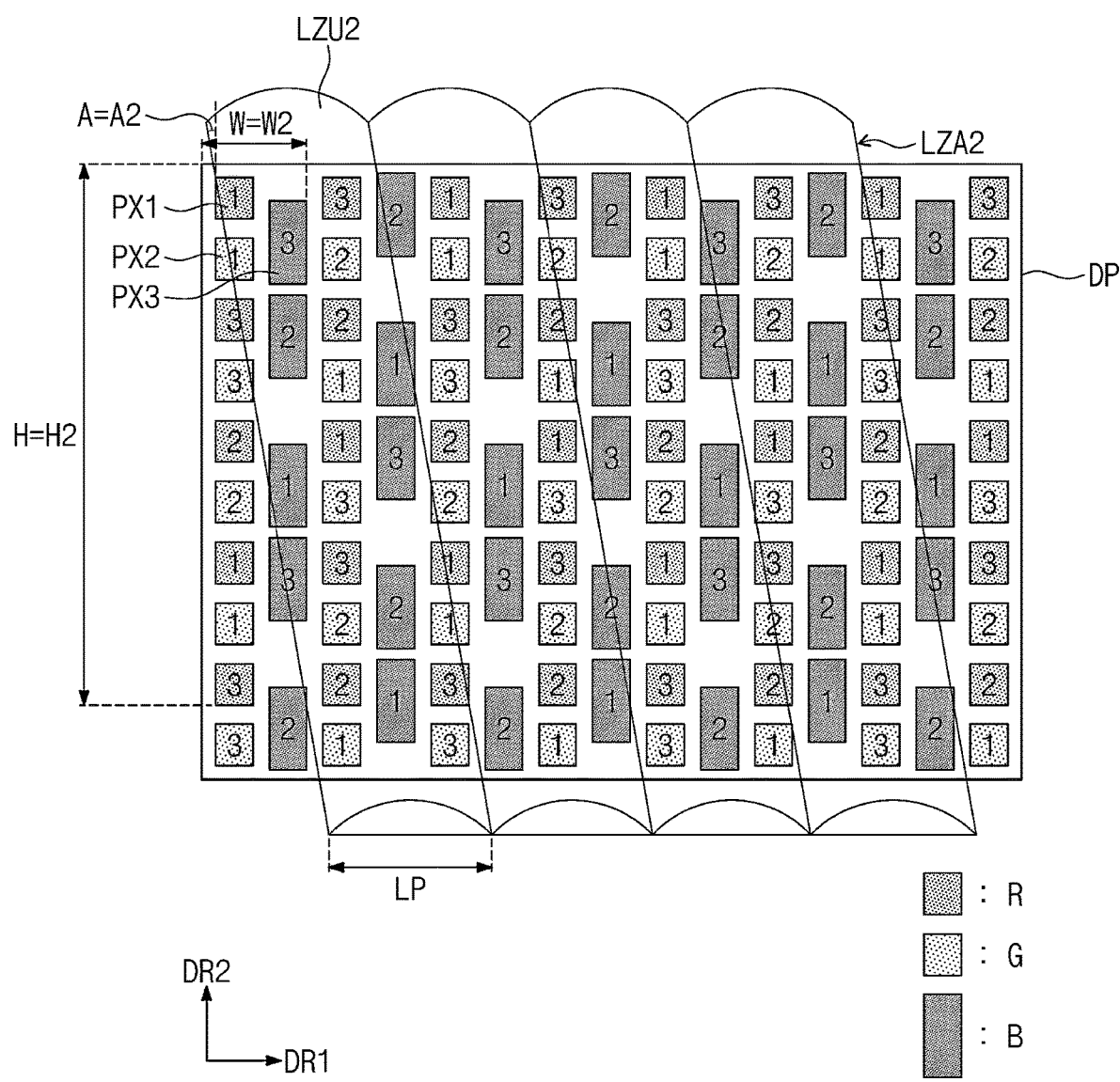
FIG. 11 illustrates an example in which a second lens array is overlapped with a display panel.

FIG. 11 illustrates an example in which the second lens array LZA2 is overlapped with the display panel DP.

Referring to FIG. 11, each of the second lens units LZU2 of the second lens array LZA2 overlaps three pixels in the first direction DR1. That is, since one second lens unit LZU2 corresponds to three pixels in the first direction DR1, the pitch LP of the second lens unit LZU2 may be 3×Rb (refer to FIG. 6B).

In FIG. 11, numbers indicated in the first to third type pixels PX1, PX2, and PX3 represent viewpoint numbers of image signals to be provided to the first to third type pixels PX1, PX2, and PX3. In an exemplary embodiment, the number '1' indicated in the first type pixel PX1 and the second type pixel PX2 refers to an image signal corresponding to the first viewpoint, for example. The number '3' indicated in the third type pixel PX3 refers to an image signal corresponding to the third viewpoint.

In the exemplary embodiment shown in FIG. 11, since each of the second lens units LZU2 of the second lens array LZA2 has an inclination of inclination angle (A=A2), the first to third type pixels PX1, PX2, and PX3 corresponding to one second lens unit LZU2 may output image signals of different viewpoints. In an exemplary embodiment, the first type pixels PX1 corresponding to one second lens unit LZU2 may output image signals of a first viewpoint, a second viewpoint, and a third viewpoint, for example. Therefore, the display quality of the 3D image may be improved.

As shown in FIG. 11, when the second lens array LZA2 is disposed on the display panel DP, the inclination angle is A=A2, the number of pixels in the second direction DR2 is H=H2=9, and the number of pixels in the first direction DR1 is W=W2=2.

The first lens array LZA1 illustrated in FIG. 8 may be disposed on the display panel DP illustrated in FIG. 11. In this case, the inclination angle may be set to A=A1, the number of pixels in the second direction DR2 may be set to H=H1=11, and the number of pixels in the first direction DR1 may be set to W=W1=2.

In addition, the third lens array LZA3 illustrated in FIG. 10 may be disposed on the display panel DP illustrated in FIG. 11. In this case, the inclination angle may be set to A=A3, the number of pixels in the second direction DR2 may be set to H=H3=8, and the number of pixels in the first direction DR1 may be set to W=W3=2.

In addition, the first to third type pixels PX1, PX2, and PX3 may output an image signal of a viewpoint corresponding to each of the inclination angles A1, A2, and A3 of the first to third lens arrays LZA1, LZA2, and LZA3.

Figure 12:
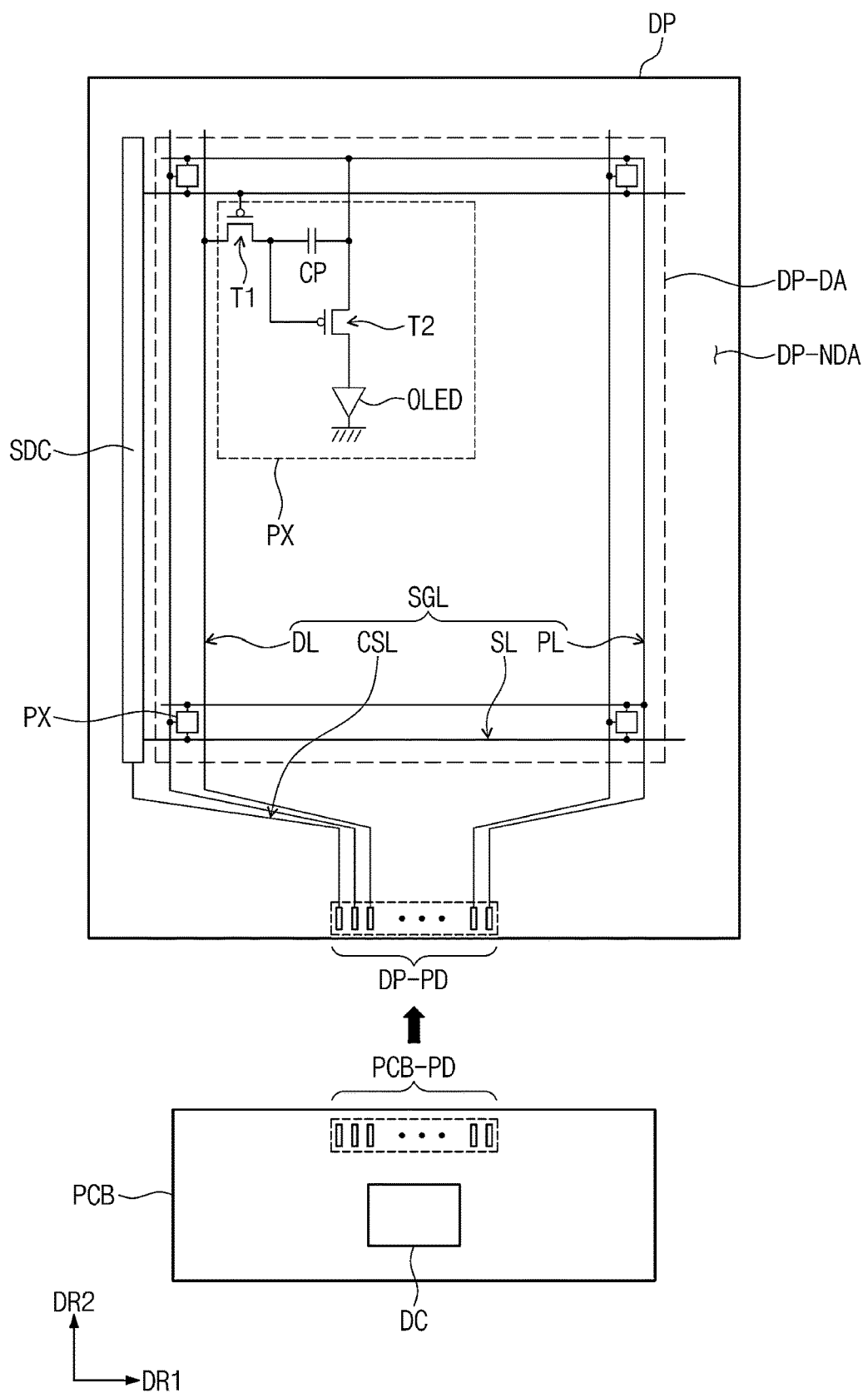
FIG. 12 is a plan view illustrating an exemplary embodiment of a display panel according to the invention.

FIG. 12 is a plan view of an exemplary embodiment of a display panel DP according to the invention.

As illustrated in FIG. 12, the display panel DP may include a driving circuit SDC, a plurality of signal lines SGL (hereinafter referred to as signal lines), a plurality of signal pads DP-PD (hereinafter referred to as signal pads), and a plurality of pixels PX (hereinafter referred to as pixels).

The driving circuit SDC may include a scan driving circuit. The scan driving circuit generates a plurality of scan signals (hereinafter, also referred to as scan signals), and sequentially outputs the scan signals to a plurality of scan lines SL (hereinafter referred to as scan lines) described later. The scan driving circuit SDC may further output another control signal to the pixels PX.

The scan driving circuit SDC may include a plurality of transistors provided through the same process as the driving circuit of the pixels PX, for example, a process of forming a P-type transistor having a low temperature polycrystalline silicon ("LTPS") semiconductor layer or a process of forming an N-type transistor using an oxide semiconductor as a semiconductor layer.

The signal lines SGL include scan lines SL, data lines DL, a power line PL, and a control signal line CSL. The scan lines SL are respectively connected to corresponding pixels PX among the pixels PX, and the data lines DL are respectively connected to corresponding pixels PX among the pixels PX. The power line PL is connected to the pixels PX. The control signal line CSL may provide control signals to the scan driving circuit SDC.

The signal pads DP-PD are disposed adjacent to each other in a portion of the non-display area DP-NDA. The stacked structure or constituent material of the signal pads DP-PD is not distinguished from each other, and may be provided through the same process.

The display area DP-DA may be defined as an area in which the pixels PX are disposed. A plurality of electronic elements is disposed in the display area DP-DA. The electronic elements include an organic light emitting diode provided in each of the pixels PX and a pixel driving circuit connected thereto.

The pixel PX may include, for example, a first transistor T1, a second transistor T2, a capacitor CP, and an organic light emitting diode OLED. The pixel driving circuit is sufficient to include the first transistor T1 and the second transistor T2, but is not limited to the exemplary embodiment shown in FIG. 12. The first transistor T1 is connected to the scan line SL and the data line DL. The organic light emitting diode OLED receives the power voltage provided by the power line PL.

The organic light emitting diode OLED may emit one of red light R, green light G, and blue light B according to at least one color of the emission layer, the conversion layer, and the color filter. The pixel PX may be referred to as any one of the first to third type pixels PX1, PX2, and PX3 (refer to FIGS. 6A and 7) according to the emission color of the organic light emitting diode OLED.

The panel driving circuit DC for controlling the operation of the display panel DP may be disposed on the circuit board PCB. The panel driving circuit DC may be disposed (e.g., mounted) on a circuit board PCB in the form of an integrated chip. The circuit board PCB may include circuit board pads PCB-PD electrically connected to the signal pads DP-PD. Although not shown in the drawing, the circuit board PCB further includes signal lines connecting the circuit board pads PCB-PD and the panel driving circuit DC. In addition, the circuit board pads PCB-PD may include at least one output pad and at least one input pad.

The signal pads DP-PD and the circuit board pads PCB-PD of the display panel DP may be directly connected. In another exemplary embodiment, the signal pads DP-PD and the circuit board pads PCB-PD may be electrically connected through a connecting substrate such as an anisotropic conductive film.

In another exemplary embodiment, the panel driving circuit DC may be disposed (e.g., mounted) in the non-display area DP-NDA of the display panel DP instead of the circuit board PCB.

Figure 13:
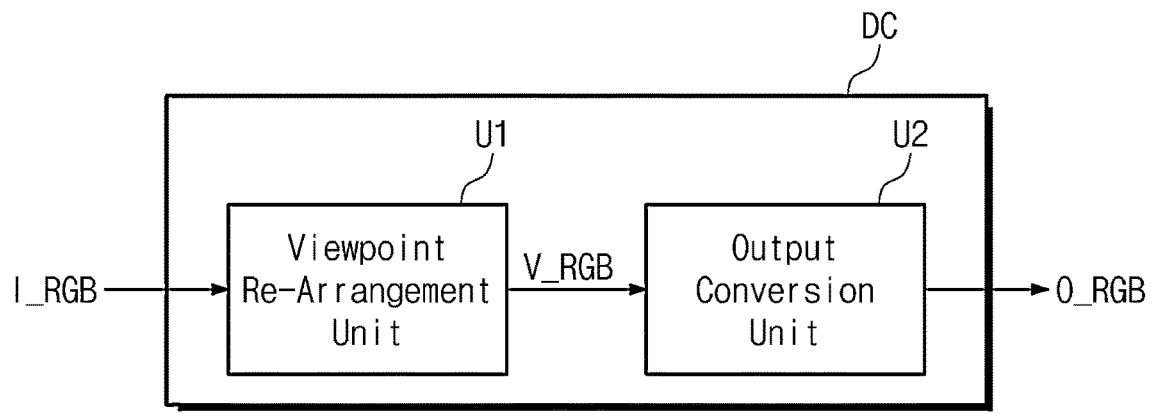
FIG. 13 is a block diagram illustrating an exemplary embodiment of a configuration of a panel driving circuit according to the invention.

FIG. 13 is a block diagram illustrating an exemplary embodiment of a configuration of a panel driving circuit DC according to the invention.

Referring to FIG. 13, the panel driving circuit DC includes a viewpoint re-arrangement unit U1 and an output conversion unit U2. In an exemplary embodiment of the specification, the term "unit" refers to a software component or a hardware component that performs a specific function. Hardware components may include, for example, a field-programmable gate array ("FPGA") or an application-specific integrated circuit ("ASIC"). A software component may refer to executable code and/or data used by executable code in an addressable storage medium. Thus, software components may be, for example, object-oriented software components, class components, and task components, and may include processes, functions, attributes, procedures, subroutines, program code segments, drivers, firmware, microcodes, circuit data, database, data structures, tables, arrangements or variables. The viewpoint re-arrangement unit U1 and the output conversion unit U2 may be recorded as a computer program and may include a non-volatile memory.

Figure 14:
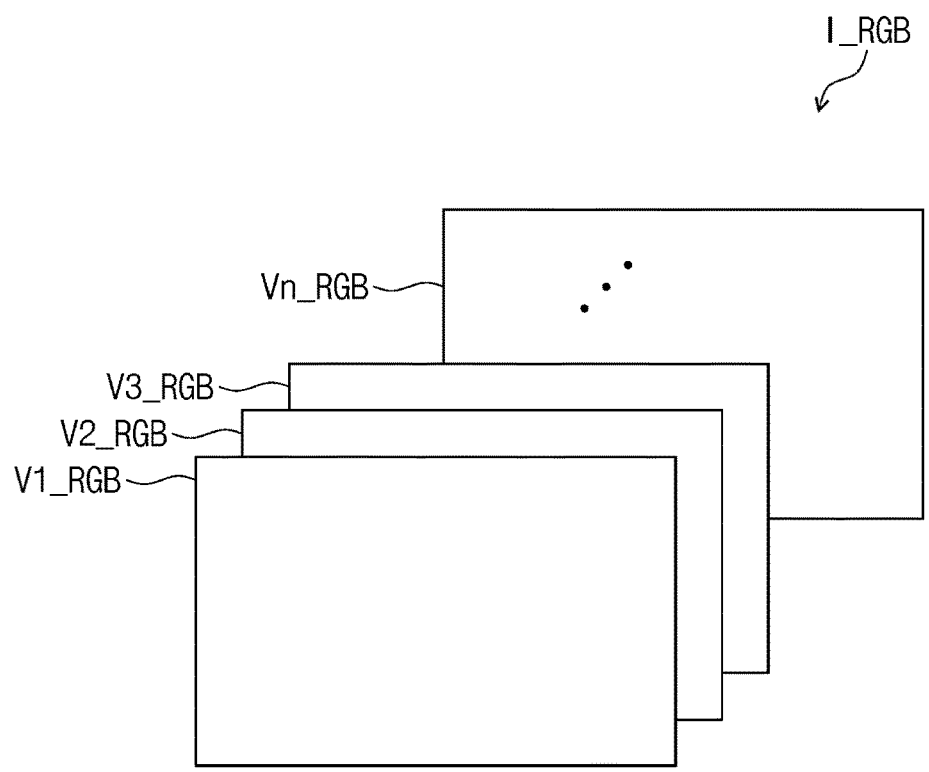
FIG. 14 is a diagram exemplarily illustrating an input image signal provided to a panel driving circuit from the outside.
Figure 15:
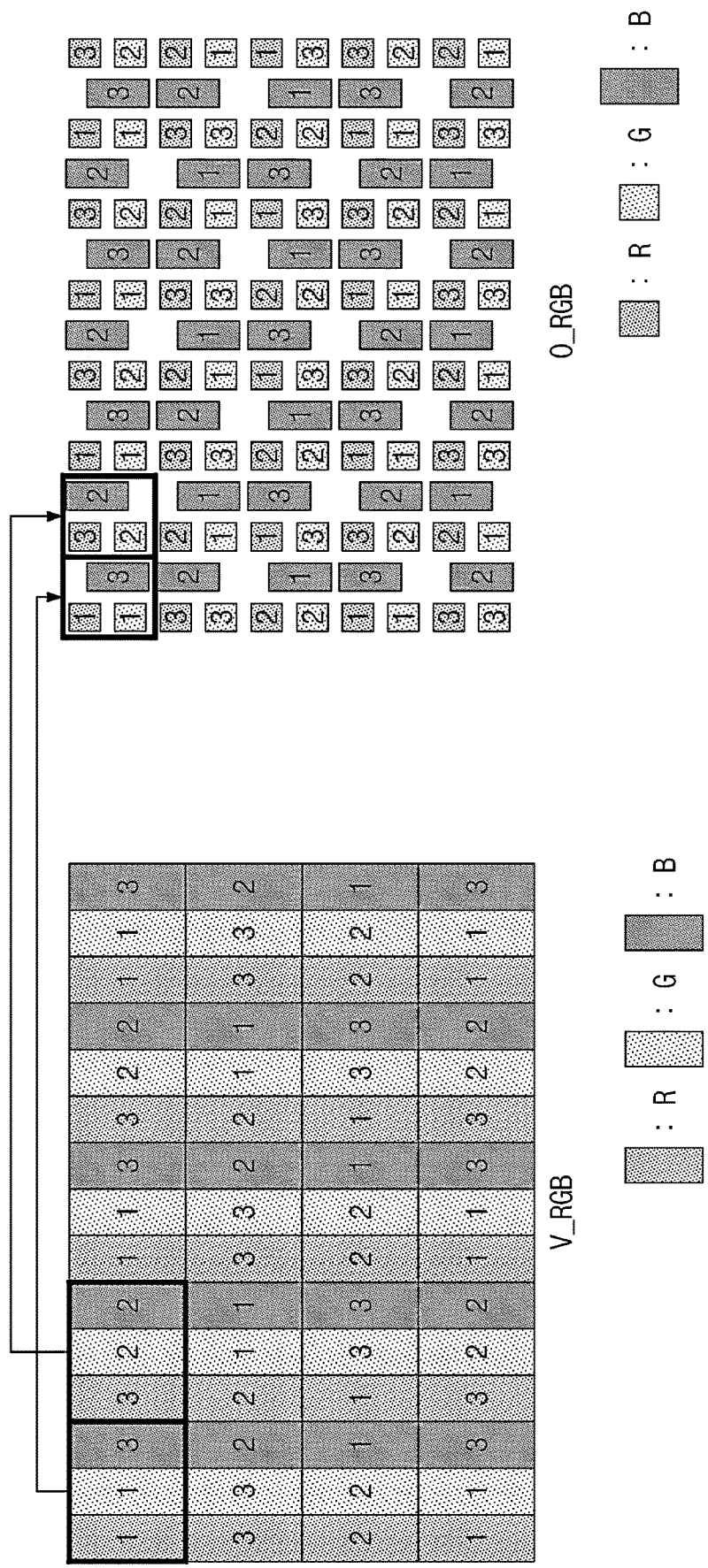
FIG. 15 is a diagram illustrating a viewpoint re-arrangement image signal outputted from the viewpoint re-arrangement unit U1 illustrated in FIG. 13 and an output image signal outputted from the output conversion unit U2.

FIG. 14 is a diagram exemplarily illustrating an input image signal I_RGB provided to the panel driving circuit DC from the outside. FIG. 15 is a diagram illustrating a viewpoint re-arrangement image signal V_RGB outputted from the viewpoint re-arrangement unit U1 illustrated in FIG. 13 and an output image signal O_RGB outputted from the output conversion unit U2.

Referring to FIGS. 13, 14 and 15, the input image signal I_RGB provided from an external host device (not shown) includes the first viewpoint image signal V1_RGB to the n-th viewpoint image signal Vn_RGB. The first viewpoint image signal V1_RGB to the n-th viewpoint image signal Vn_RGB may be signals of a plurality of perspective view images captured by a plurality of real cameras or a plurality of virtual cameras at different positions and/or angles. That is, the first viewpoint image signal V1_RGB to the n-th viewpoint image signal Vn_RGB may correspond to the first to n-th viewpoints, respectively.

Each of the first viewpoint image signal V1_RGB to the n-th viewpoint image signal Vn_RGB includes only one viewpoint.

The viewpoint re-arrangement unit U1 rearranges the first viewpoint image signal V1_RGB to the n-th viewpoint image signal Vn_RGB as an image signal of one frame and outputs the viewpoint rearrangement image signal V_RGB. The process of outputting the first viewpoint image signal V1_RGB to the n-th viewpoint image signal Vn_RGB as the viewpoint rearrangement image signal V_RGB may be referred to as mapping.

As shown in FIG. 11, when the second lens array LZA2 overlaps the display panel DP, FIG. 15 illustrates that a viewpoint re-arrangement image signal V_RGB is mapped to correspond to an image signal of a viewpoint suitable for each of the first to third type pixels PX1, PX2, and PX3. The viewpoint re-arrangement unit U1 may output the viewpoint re-arrangement image signal V_RGB according to the inclination angle A of the lens array overlapping the display panel DP (refer to FIG. 12).

The output conversion unit U2 converts the viewpoint re-arrangement image signal V_RGB to match the display panel DP illustrated in FIG. 5 and outputs the output image signal O_RGB. As described above, the display panel DP illustrated in FIG. 5 includes a pixel arrangement of an "S-stripe structure". The output image signal O_RGB may be provided to the pixels PX through the data lines DL shown in FIG. 12.

In the display module having such a configuration, pixels of the display panel are arranged in an S-stripe manner. The lens array may be arranged at an optimal inclination angle according to the first pitch in the first direction and the second pitch of the pixels in the second direction. Therefore, the display device may display a 3D image on an S-stripe type display panel.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

What is claimed is:

1. A display module comprising:
a display panel including a plurality of pixels including a first type pixel, a second type pixel, and a third type pixel; and
a lens array disposed on a first surface of the display panel and having an inclination angle,
wherein the first type pixel and the second type pixel are disposed adjacent to each other in a second direction,
wherein the third type pixel is disposed adjacent to the first type pixel and the second type pixel in a first direction,
wherein a pitch of the third type pixel in the second direction is less than or equal to a sum of a pitch of the first type pixel in the second direction and a pitch of the second type pixel in the second direction, and
wherein the inclination angle is relative to a reference line that is an imaginary line parallel to the second direction.

2. The display module of claim 1, an area of the third type pixel is larger than each of the first type pixel and the second type pixel.

3. The display module of claim 1, wherein a pitch of the third type pixel in the first direction is greater than a pitch of each of the first type pixel and the second type pixel in the first direction.

4. The display module of claim 1, wherein the lens array operates in a two-dimensional display mode based on an applied voltage.

5. The display module of claim 1, wherein the plurality of pixels includes a plurality of first type pixels, a plurality of second type pixels, and a plurality of third type pixels,
wherein the inclination angle of the lens array is determined by a value calculated by $$\tan^{-1}\left(\frac{Rb + Bb}{n \times Ra + m \times Ga}\right),$$

wherein Ra is a first pitch of each of the plurality of first type pixels in the first direction,
wherein Rb is a second pitch of each of the plurality of first type pixels in the second direction,
wherein Ga is a third pitch of each of the plurality of second type pixels in the first direction,
wherein Bb is a fourth pitch of each of the plurality of third type pixel in the second direction, and
wherein n is a number of the plurality first type pixels in the first direction and m is a number of the plurality second type pixels in the first direction.

6. The display module of claim 5, wherein a fifth pitch of each of the plurality of third type pixels in the first direction is greater than any one of the first pitch and the third pitch,
wherein the fifth pitch is less than or equal to the sum of the first pitch and the third pitch.

7. The display module of claim 5, wherein when the first pitch, the second pitch, the third pitch, and the fourth pitch are equal to each other, the inclination angle is determined by a value calculated by $$\tan^{-1} = \left(\frac{2}{n + m}\right).$$

8. The display module of claim 5, wherein n and m are different natural numbers from each other.

9. The display module of claim 1, wherein the lens array comprises a plurality of lens units arranged in the second direction,
wherein each of the plurality of lens units corresponds to k pixels arranged in the second direction among the plurality of pixels, and
k is a natural number.

10. The display module of claim 9, wherein the k pixels, which correspond to any one of the plurality of lens units and are arranged in the second direction, respectively correspond to any one of k viewpoints.

11. The display module of claim 10, wherein the first type pixel and the second type pixel adjacent in the first direction correspond to a same viewpoint or different viewpoints.

12. The display module of claim 1, wherein the first type pixel and the second type pixel correspond to a viewpoint different from the third type pixel.

13. The display module of claim 1, wherein the lens array comprises a lenticular lens array.

14. The display module of claim 1, wherein the first type pixel emits red light, the second type pixel emits green light, and the third type pixel emits blue light.

15. A display device comprising:
a display panel including a plurality of pixels including first type pixels, second type pixels, and third type pixels;
a lens array disposed on the display panel; and
a panel driving circuit which receives an input image signal and provides an output image signal to the display panel,
wherein the first type pixels and the second type pixels are disposed adjacent to each other in a first direction,
wherein the third type pixels is disposed adjacent to the first type pixels and the second type pixels in a second direction,
wherein the lens array has a shape inclined at an inclination angle with respect to a virtual reference line parallel to the first direction,
wherein the inclination angle is determined by a value calculated by $$\tan^{-1}\left(\frac{Rb + Bb}{n \times Ra + m \times Ga}\right),$$

wherein Ra is a first pitch of each of the plurality of first type pixels in the first direction,
wherein Rb is a second pitch of each of the plurality of first type pixels in the second direction,
wherein Ga is a third pitch of each of the plurality of second type pixels in the first direction,
wherein Bb is a fourth pitch of each of the plurality of third type pixel in the second direction, and
wherein n is a number of the plurality first type pixels in the first direction and m is a number of the plurality second type pixels in the first direction, and
wherein the lens array which operates in one of a two-dimensional display mode and a three-dimensional display mode based on an applied voltage.

16. The display device of claim 15, wherein the input image signal comprises a plurality of viewpoint image signals corresponding to a plurality of viewpoints, respectively.

17. The display device of claim 16, wherein the panel driving circuit comprises:
a viewpoint re-arrangement part which outputs viewpoint re-arrangement image signals in which the plurality of viewpoint image signals is rearranged in a viewpoint order corresponding to the inclination angle of the lens array; and
an output conversion part which converts the viewpoint re-arrangement image signals into the output image signal suitable for a pixel arrangement structure of the display panel.

18. The display device of claim 15, an area of each of the third type pixels is larger than each of the first type pixels and the second type pixels.

19. The display device of claim 15, wherein when the first pitch, the second pitch, the third pitch, and the fourth pitch are equal to each other, the inclination angle is determined by a value calculated by $$\tan^{-1} = \left(\frac{2}{n+m}\right),$$

wherein n is a number of the plurality first pixels in the first direction and m is a number of the plurality second pixels in the first direction.

20. The display device of claim 15, wherein the lens array comprises a plurality of lens units arranged in the second direction,
wherein each of the plurality of lens units corresponds to k pixels arranged in the second direction among the plurality of pixels, and
k is a natural number.

* * * * *